Patented Mar. 5, 1929.

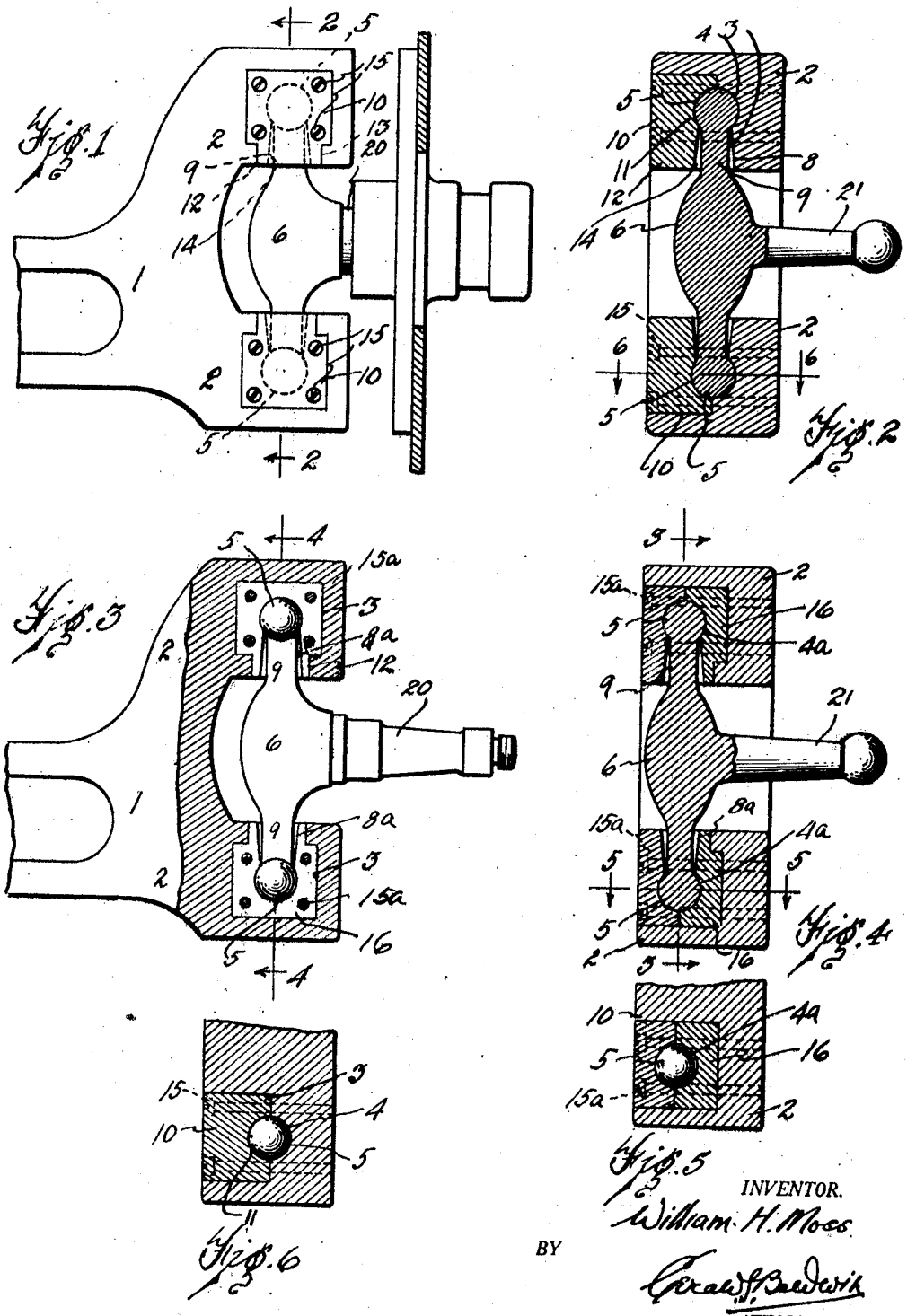

1,704,140

UNITED STATES PATENT OFFICE.

WILLIAM H. MOSS, OF DETROIT, MICHIGAN.

STUB-AXLE MOUNT.

Application filed February 23, 1927. Serial No. 170,194.

This invention relates to improvements in stub axle mounts, and aims, among other things, to provide quick and easy means for taking up wear between the axles and spindles, as wear at this point frequently results in the front wheels shimmying.

Another object of the invention is to provide a stub axle mount so constructed that there is practically no possibility of the ends of the mount freezing in their axles in which they are intended to turn freely; and also to so mount the axles that they are free to turn about a variable and substantially vertical axis, or to a limited extent about either an inclined or horizontal axis, so that any strain on the axle will not be transmitted to the stub axles in such a way as to tend to throw the wheels out of line.

A further object of the invention is to provide a stub axle mount wherein split removable bushings are employed which are readily interchangeable; and also to so insert the ends of the mount in the axle that the latter is not materially weakened.

Having thus broadly outlined the main objects of the invention I will now proceed to describe the preferred embodiments thereof with the aid of the accompanying drawings, in which:

Figure 1 is a front elevation of portion of an axle with a stub axle mounted therein.

Figure 2 is a section on the line 2—2 of Figure 1.

Figures 3 and 4 which show a modified construction are sections on the lines 3—3 and 4—4 of Figures 4 and 3 respectively.

Figure 5 is a section on the line 5—5 of Figure 4, and

Figure 6 is a section on the line 6—6 of Figure 2.

Referring to the drawings, 1 designates portion of an axle which terminates at its ends in the usual bifurcations 2.

Referring first to Figures 1, 2 and 6. From the front and substantially centrally in each bifurcation is a cavity 3, the back portion of which is hollowed out to form a bearing 4 for one side of one of the substantially spherical ends 5 of the member 6; and extending inwardly from each bearing to the inner side of its bifurcation is a substantially semi-circular passage 8 which is usually of gradually increasing diameter as its distance from the bearing 4 increases, so as to permit the ends 5 to turn to a limited extent in any direction before the intermediate portions 9 of the member come in contact with the side of the passages. In the outer sides of the cavities blocks 10 are inserted. These blocks have their inner surfaces hollowed out at 11 to support the outer sides of the ends 5 of the supporting members, and their inner ends 12 are of reduced width to take into corresponding grooves 13 in the inner sides of the bifurcations. The blocks have substantially semi-circular passages 14 which extend from the hollowed out portions 11 to their inner sides and are of gradually increasing size as are the passages 8 and for the same purpose.

The blocks 10 are held in position in their cavities as by screws 15 which take into threaded holes 7 in the bifurcations.

In the construction shown in Figures 3, 4 and 5 the construction is slightly modified. Rear bushings 16 are provided in the back of the cavities 3 and have bearings $4^a$ therein for the rear halves of the ends 5 of the members 6, and passages $8^a$ are provided in the bushings similar to the passages 8 in the axle in the other form of construction. Similar blocks 10 are used, and both they and the bushings are held in position as by screws $15^a$ which are also threaded into the bifurcations.

Integral with each member 6, which is normally vertically positioned, and substantially centrally of its length, a stub axle 20 extends horizontally so that the member and its stub axle together form a T shaped unit. The stub axles may of course be of any desired form to suit the wheels to be mounted thereon. 21 is a steering arm on the members 6.

In the foregoing the preferred constructions have been described and shown, it is however understood that the construction is susceptible to such further modifications as fall within the scope of the appended claims.

What I claim is:

1. A stub axle mount comprising an axle having bifurcated ends, said ends having cavities therein extending inwardly from their sides, the end walls of said cavities having semi-spherical bearing surfaces formed therein, members having substantially spherical ends one of which rests against the bearing surface in each cavity, a block in each cavity having a semi-spherical bearing surface to support the other side of the spherical end in that cavity, said bifurcated end and said blocks having complementary passages therein extending from said bearing surfaces to their inner sides for the intermediate portions of said members to pass through, means for holding said blocks in position, and spindles extending substantially at right angles from said members.

2. In a stub axle mount as described in claim 1, the combination wherein a bushing is provided in each cavity in which the rear semi-spherical bearing surface for one spherical end is formed.

3. In a stub axle mount as described in claim 1, the combination wherein a bushing is provided in each cavity having the rear semi-spherical bearing surface for one spherical end and also an inward passage for the intermediate portion of one of said members to extend through.

WILLIAM H. MOSS.